US009517672B2

(12) United States Patent
Takeuchi

(10) Patent No.: US 9,517,672 B2
(45) Date of Patent: Dec. 13, 2016

(54) SHOCK ABSORBER

(71) Applicant: KAYABA INDUSTRY CO., LTD., Tokyo (JP)

(72) Inventor: Hideaki Takeuchi, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/412,043

(22) PCT Filed: Jul. 18, 2013

(86) PCT No.: PCT/JP2013/069475
§ 371 (c)(1),
(2) Date: Dec. 30, 2014

(87) PCT Pub. No.: WO2014/021111
PCT Pub. Date: Feb. 6, 2014

(65) Prior Publication Data
US 2015/0197132 A1    Jul. 16, 2015

(30) Foreign Application Priority Data

Aug. 3, 2012    (JP) .................................. 2012-172731

(51) Int. Cl.
*F16F 1/12*    (2006.01)
*B60G 11/16*    (2006.01)
(Continued)

(52) U.S. Cl.
CPC ............. *B60G 15/063* (2013.01); *B60G 11/16* (2013.01); *F16F 1/12* (2013.01); *F16F 9/32* (2013.01);
(Continued)

(58) Field of Classification Search
CPC .................... B60G 15/063; B60G 11/16; B60G 2204/12422; B60G 2202/31; F16F 13/007; F16F 9/32; F16F 9/3207; F16F 1/12
(Continued)

(56) References Cited

U.S. PATENT DOCUMENTS 3,726,517 A * 4/1973 Lutz ...................... B60G 15/00
                                                        267/64.23
4,249,645 A * 2/1981 Level ...................... F16F 9/38
                                                        188/322.12
(Continued)

FOREIGN PATENT DOCUMENTS

DE       2645773 A1 *  4/1978  ............... B60G 3/01
DE     19920017 A1 * 11/2000  ........... B60G 15/063
(Continued)

OTHER PUBLICATIONS

EPO machine translation, DE 10053576, Mar. 2002.*

*Primary Examiner* — Thomas J Williams
(74) *Attorney, Agent, or Firm* — Rabin & Berdo, P.C.

(57) ABSTRACT

A shock absorber provided with a suspension spring, the shock absorber includes a tube whose lower end portion is joined to a vehicle axle side portion provided with a tire, and a lower spring bearing that is provided on an outer circumference of the tube and supports a lower end of the suspension spring. The lower spring bearing includes a bearing part on which the lower end of the suspension spring is seated, and a contact part that is continuous with the bearing part. An outer diameter of the contact part is larger than an outer diameter of the tube.

11 Claims, 3 Drawing Sheets

(51) Int. Cl.
  *B60G 15/06* (2006.01)
  *F16F 9/32* (2006.01)
  *F16F 13/00* (2006.01)
(52) U.S. Cl.
  CPC ........... *F16F 9/3207* (2013.01); *F16F 13/007* (2013.01); *B60G 2202/31* (2013.01); *B60G 2202/312* (2013.01); *B60G 2204/12422* (2013.01)
(58) Field of Classification Search
  USPC ................ 188/322.2; 267/217, 221, 226; 280/124.157, 124.162, 124.164, 124.179
  See application file for complete search history.

(56) References Cited

U.S. PATENT DOCUMENTS

| | | | | |
|---|---|---|---|---|
| 5,544,725 | A * | 8/1996 | Handke | B60G 15/063 267/221 |
| 6,293,533 | B1 * | 9/2001 | Sasse | B60G 13/008 267/221 |
| 6,357,734 | B1 * | 3/2002 | Lisenker | B60G 15/063 267/221 |
| 6,883,651 | B2 * | 4/2005 | Fukaya | B60G 11/14 267/221 |
| 2004/0119217 | A1 * | 6/2004 | Kon | B60G 15/063 267/221 |
| 2014/0232084 | A1 * | 8/2014 | Suzuki | F16F 1/12 280/124.179 |
| 2015/0165854 | A1 * | 6/2015 | Takeuchi | B60G 15/063 267/220 |

FOREIGN PATENT DOCUMENTS

| | | | | |
|---|---|---|---|---|
| DE | 10053576 C1 | * | 3/2002 | ......... B60G 15/063 |
| JP | 02253026 A | * | 10/1990 | |
| JP | 2004-197838 A | | 7/2004 | |
| JP | 2004353699 A | | 12/2004 | |
| JP | 2006-029422 A | | 2/2006 | |
| JP | 2010-247678 A | | 11/2010 | |
| JP | 2010-276113 A | | 12/2010 | |
| JP | 2011-106609 A | | 6/2011 | |

* cited by examiner

US 9,517,672 B2

SHOCK ABSORBER

TECHNICAL FIELD

The present invention relates to a shock absorber, and in particular to a shock absorber that is provided with a suspension spring and composes a suspension of a vehicle.

BACKGROUND ART

A shock absorber composing a suspension of a vehicle is provided in a wheelhouse of the vehicle. An upper end portion of the shock absorber is joined to a vehicle body side portion of the vehicle, whereas a lower end portion of the shock absorber is joined to a vehicle axle side portion of the vehicle.

When providing the shock absorber in the wheelhouse, the shock absorber is positioned behind a tire, that is to say, in an upper back side of the wheelhouse, so as to avoid interference of the shock absorber with the tire as disclosed in, for example, JP 2010-247678A.

SUMMARY OF INVENTION

However, in recent years, there is a tendency to lower a heightwise position of a hood in terms of, for example, vehicle safety in collision. Accordingly, an upper end position of a wheelhouse is becoming low. Therefore, a heightwise position in which a shock absorber is provided is becoming low compared to conventional cases. As a result, there is a tendency to position a lower end portion of a suspension spring, which is wound around the shock absorber, behind a tire.

Even if the lower end portion of the suspension spring is positioned behind the tire, there is no possibility that the lower end portion of the suspension spring interferes with the tire while the shock absorber is in a normal operation state. However, for example, if the suspension spring rusts after prolonged use of the vehicle over serviceable years, there is a possibility that the rusted lower end portion of the suspension spring breaks due to an action of an unexpected external force applied to the shock absorber. In this case, a lower end portion of the broken suspension spring could possibly interfere with and damage the tire.

It is an object of the present invention to provide a shock absorber with which, even if a lower end portion of a suspension spring breaks, interference of a lower end portion of the broken suspension spring with a tire can be avoided.

According to one aspect of the present invention, a shock absorber provided with a suspension spring, the shock absorber includes a tube whose lower end portion is joined to a vehicle axle side portion provided with a tire, and a lower spring bearing that is provided on an outer circumference of the tube and supports a lower end of the suspension spring. The lower spring bearing includes a bearing part on which the lower end of the suspension spring is seated, and a contact part that is continuous with the bearing part. An outer diameter of the contact part is larger than an outer diameter of the tube.

DESCRIPTION OF EMBODIMENTS

The following describes an embodiment of the present invention with reference to the drawings.

A shock absorber 100 according to an embodiment of the present invention will now be described with reference to FIGS. 1 to 3.

Figure 1:
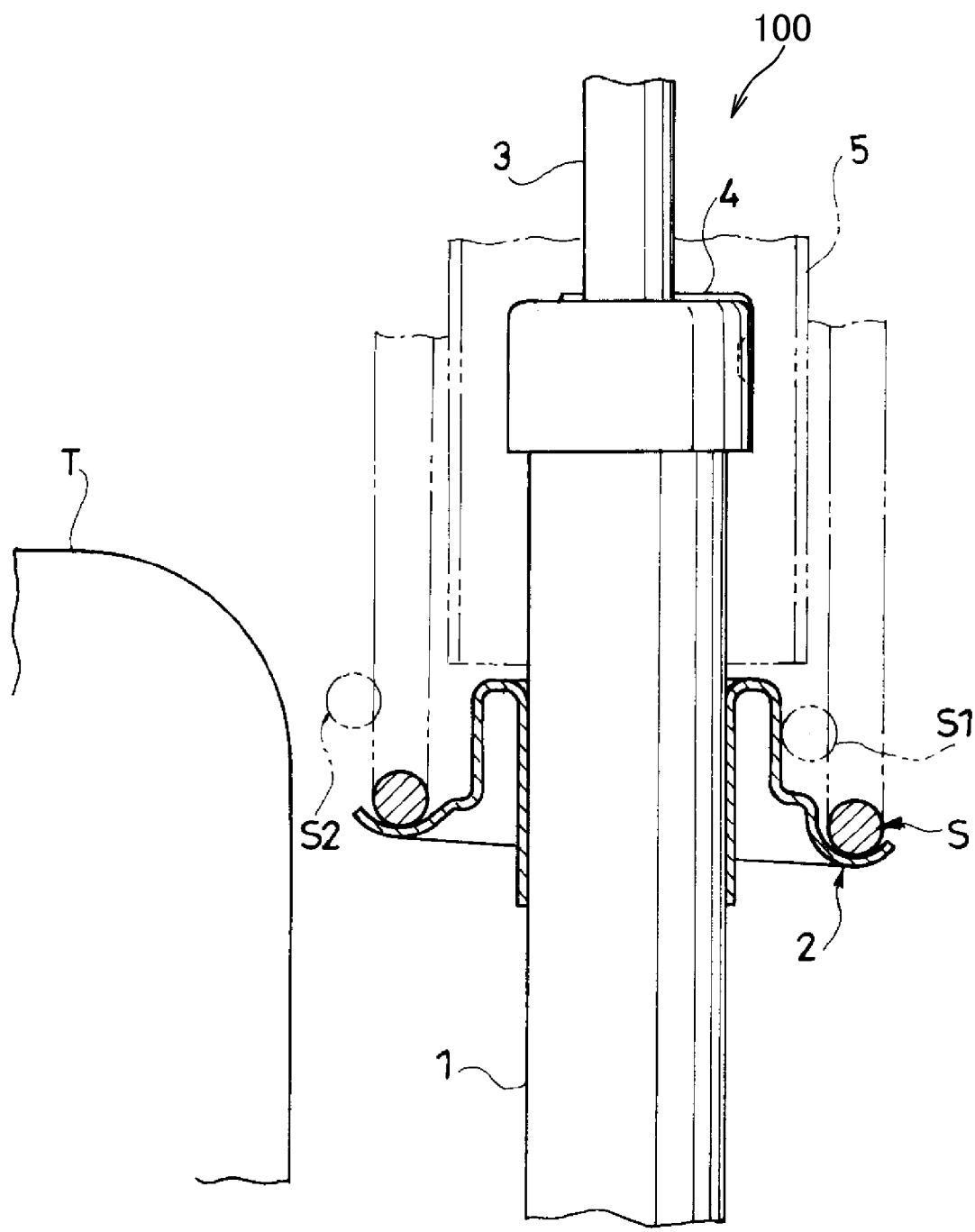
FIG. 1 is a partial side view of a shock absorber according to an embodiment of the present invention.

As shown in FIG. 1, the shock absorber 100 includes a tube 1, a lower spring bearing 2, and a suspension spring S. A lower end portion of the tube 1 is joined to a vehicle axle side portion provided with a tire T. The lower spring bearing 2 is provided on an outer circumference of the tube 1. A lower end of the suspension spring S is supported by the lower spring bearing 2.

In the present embodiment, the shock absorber 100 is of a multi-tube type. The tube 1 is an outer tube. A cylinder is provided inside the tube 1. A piston rod 3 is slidably inserted into the cylinder. An upper end side of the piston rod 3 projects upward from an upper end portion of the tube 1.

The tube 1 is composed as a lower end side member, and is joined to a vehicle axle side portion of a vehicle via, for example, a knuckle bracket (not shown). The piston rod 3 is composed as an upper end side member, and is joined to a vehicle body side portion of the vehicle via, for example, a mount (not shown).

A cap-shaped bump stopper 4 is provided on the upper end portion of the tube 1. A cross-section of the bump stopper 4 has a downward facing squared U-shape. The piston rod 3 penetrates through a hole formed in a shaft core region of an upper end portion of the bump stopper 4.

A gap is formed between the hole formed in the shaft core region of the bump stopper 4 and the piston rod 3. Via this gap, dust accumulated on an upper end of the bump stopper 4 is discharged toward a downward side of the bump stopper 4.

On the upper end portion of the tube 1 at an inner side of the bump stopper 4, a rod guide and a seal member held by the rod guide are provided at an inner side. The rod guide guides a relative axial movement of the piston rod 3 with respect to the tube 1. The seal member seals between the piston rod 3 and the tube 1.

The inside of the cylinder of the shock absorber 100 is partitioned into two pressure chambers by a piston provided to an end portion of the piston rod 3. The piston is provided with a damping force generation element that applies resistance to a working fluid that moves back and forth between the two pressure chambers in accordance with a movement of the piston rod 3. In this way, in the shock absorber 100, the damping force generation element exerts a damping action when the piston rod 3 proceeds into and recedes from the tube 1.

As the shock absorber 100 is of a multi-tube type, the lower spring bearing 2 is fixed to the outer circumference of the tube 1 by welding. The suspension spring S, whose lower end is supported by the lower spring bearing 2, is formed by a coil spring, which is a compression spring. The coil spring is made of metal.

An upper end of the suspension spring S is engaged with an upper spring bearing that is positioned below the mount and provided to an upper end portion of the piston rod 3. Therefore, the suspension spring S provided between the lower spring bearing 2 and the upper spring bearing elastically supports a vehicle body of the vehicle with an extensional pushing force.

The lower end of the suspension spring S is not ground for the following reason: a lower end portion of the suspension spring S has a higher strength against breakage when the lower end of the suspension spring S is not ground than when the lower end of the suspension spring S is ground. However, the present embodiment is not intended to exclude the suspension spring S with a ground lower end.

Figure 2:
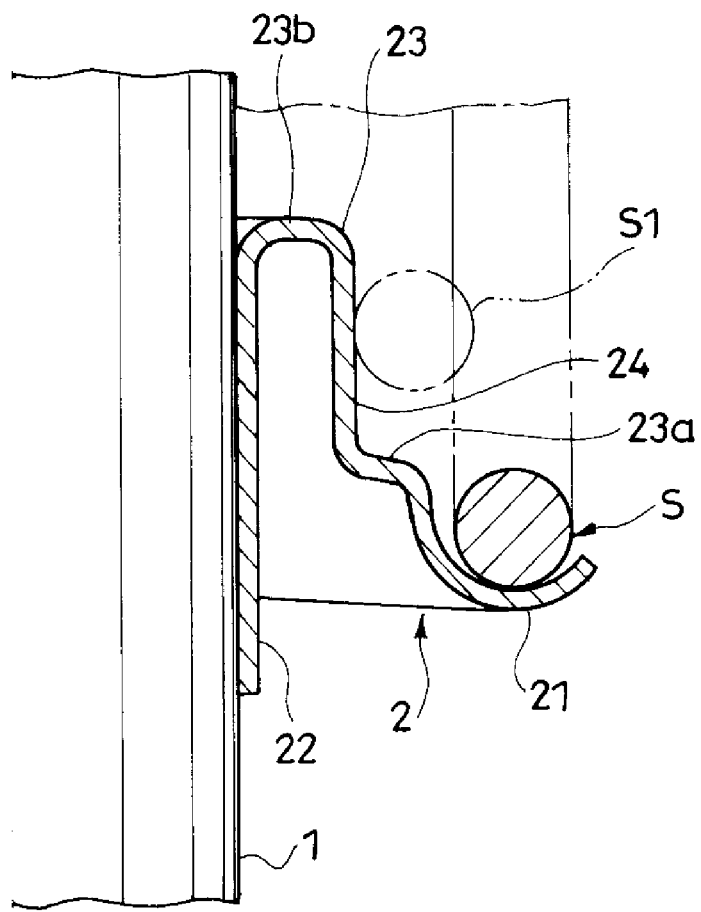
FIG. 2 is a partial enlarged vertical cross-sectional view of a lower spring bearing shown in FIG. 1.
Figure 3:
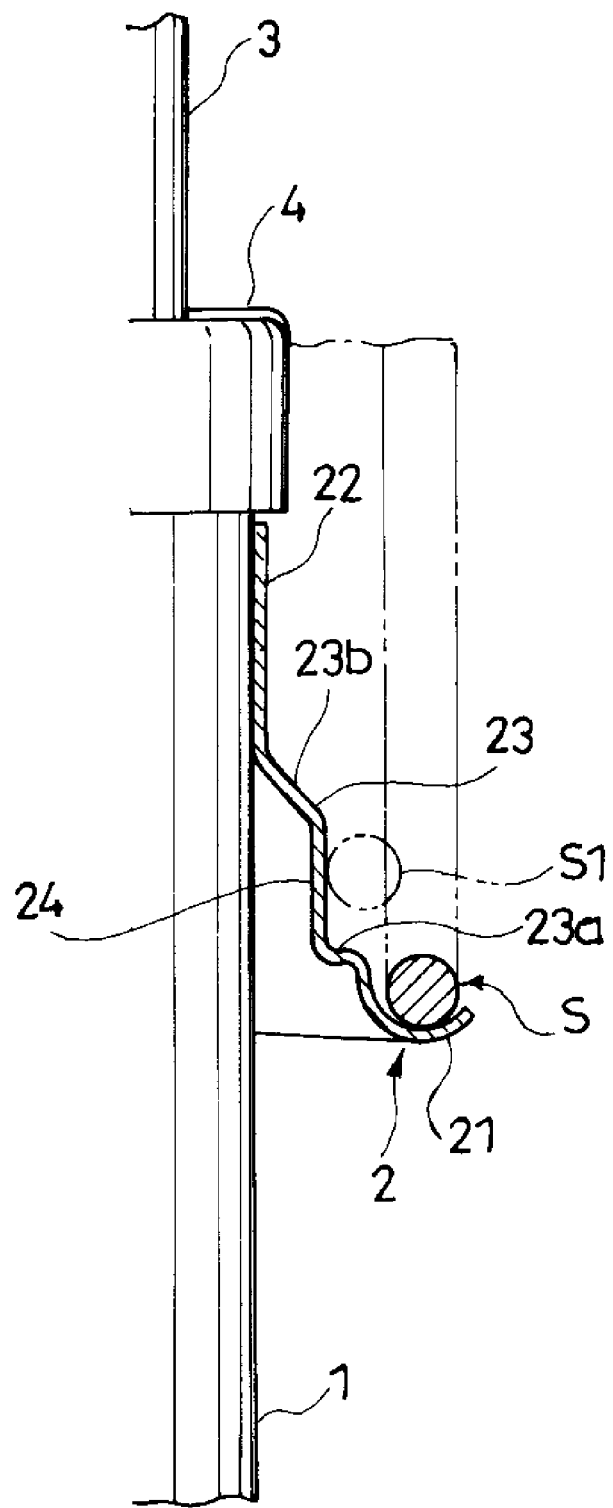
FIG. 3 is a partial vertical cross-sectional view showing a shock absorber according to another embodiment of the present invention.

As shown in FIG. 2, the lower spring bearing 2 includes a bearing part 21, a proximal part 22, and a joining part 23. The lower end of the suspension spring S is seated on the bearing part 21. The proximal part 22 is connected to the outer circumference of the tube 1. The proximal part 22 and the bearing part 21 are joined to each other via the joining part 23. The joining part 23 includes a contact part 24 formed as a cylindrical tube member that is concentric with an outer circumferential surface of the tube 1. An outer diameter of the contact part 24 is larger than an outer diameter of the tube 1.

The bearing part 21 is formed into an annular shape whose diameter is substantially the same as a winding diameter of the suspension spring S. The bearing part 21 has a concave cross-section representing an upsweep curve so as to allow the suspension spring S to be seated thereon. The proximal part 22 is formed into a tubular shape whose inner circumference coincides with the outer circumference of the tube 1. The joining part 23 is formed into an annular shape with an appropriate radial width.

As shown in FIGS. 1 and 2, the proximal part 22 is positioned behind the bearing part 21 and the joining part 23. Alternatively, the proximal part 22 may be positioned above the joining part 23 as shown in FIG. 3. In this case, dust that has fallen between the bump stopper 4 and the upper end portion of the tube 1 at an upward side falls downward along an outer side of the proximal part 22. This makes it possible to avoid a problem whereby dust is accumulated on a boundary portion between the proximal part 22 and the joining part 23.

As shown in FIG. 2, the joining part 23 of the lower spring bearing 2 includes an outer annular part 23a and an inner annular part 23b that are connected to the bearing part 21 and the proximal part 22, respectively. The outer annular part 23a is an annular member that is provided in such a manner as to radially project inward from an inner circumferential side of the bearing part 21. The inner annular part 23b is an annular member that is provided in such a manner as to radially project outward from an upper end side of the proximal part 22. An outer end portion (no reference sign) of the inner annular part 23b and an inner end portion (no reference sign) of the outer annular part 23a are joined to each other via the contact part 24 that has an appropriate heightwise dimension.

A conventional lower spring bearing also includes a bearing part, a proximal part, and a joining part, and is formed in a similar manner. On the other hand, the joining part 23 of the lower spring bearing 2 according to the present embodiment is such that the outer annular part 23a connected to the bearing part 21 and the inner annular part 23b connected to the proximal part 22 are distinct from each other, and a heightwise position of the inner annular part 23b is above a heightwise position of the outer annular part 23a.

Also, the lower spring bearing 2 is such that an outer circumferential end portion of the inner annular part 23b and an inner circumferential end portion of the outer annular part 23a, which are different in height, are joined to each other via the contact part 24 having a shape of a cylindrical tube. Therefore, an outer circumference of the contact part 24 can reliably come into contact with an inner circumference of the suspension spring S by making a heightwise dimension of the contact part 24 larger than, for example, a wire diameter dimension of the suspension spring S.

As such, in the shock absorber 100 according to the present embodiment, the lower spring bearing 2 provided on the tube 1 is different from a conventional spring bearing of this type in that the joining part 23 is provided with the contact part 24 that is increased in diameter compared to the tube 1. Therefore, in a case where the suspension spring S is shortened due to breakage of a lower end portion thereof for some reason and moves toward the tire T, the contact part 24 with the increased diameter comes into contact with a lower end portion S1 of the broken suspension spring S as indicated by a line with alternate long and two short dashes in FIG. 1. This makes it possible to prevent the suspension spring S from moving further toward the tire T.

That is to say, in the shock absorber 100 according to the present embodiment, the joining part 23 of the lower spring bearing 2 includes the contact part 24 with the increased diameter, and the contact part 24 prevents a movement of the lower end portion S1 of the broken suspension spring S. Therefore, a lower end portion S2 of the broken suspension spring S at a side opposing the tire T (see FIG. 1) is prevented from moving further toward the tire T. This makes it possible to avoid interference of the lower end portion S2 of the broken suspension spring S with the tire T.

In other words, if a lower end portion of the suspension spring S breaks due to rust and the like, the suspension spring S is shortened and thus no longer seated on the bearing part 21 of the lower spring bearing 2. This makes the lower end portion S1 of the broken suspension spring S movable in a radial direction of the tube 1.

As a result, should the lower end portion S2 of the broken suspension spring S at the side opposing the tire T move toward and interfere with the tire T, there is a possibility that the tire T be damaged. For this reason, in the shock absorber 100 according to the present embodiment, at a side opposite to the side opposing the tire T, the contact part 24 with the increased diameter of the lower spring bearing 2 prevents the lower end portion S1 of the broken suspension spring S from moving toward the tire T. In this way, interference of the lower end portion S2 of the broken suspension spring S at the side opposing the tire T with the tire T is avoided.

In view of the above, the contact part 24 with the increased diameter of the lower spring bearing 2 may be formed arbitrarily, as long as it can prevent the broken lower end portion S1 of the suspension spring S from moving toward the tire T.

Although not illustrated, the contact part 24 with the increased diameter of the lower spring bearing 2 may be formed using, for example, a method in which a standing part that stands like a partition is welded to a joining part of a conventional lower spring bearing. However, the option of providing the standing part by welding and the like requires effort in production of the lower spring bearing 2, and therefore it is basically preferable not to choose this option.

Meanwhile, in the present embodiment, the lower spring bearing 2 is formed by press working, and therefore the contact part 24 is formed integrally with the joining part 23. In this way, a separate member is not used in forming the contact part 24 for the tube 1, and hence there is no increase in the number of parts.

Also, in the present embodiment, the contact part 24 is not formed by attaching a separate add-on part. Therefore, for example, there is no possibility that the contact part 24 comes off due to rusting, deterioration, and the like of the add-on part. This enables permanent maintenance of an arranged state of the contact part 24.

In the above-described embodiment, the contact part 24 is formed for the joining part 23 by press working. However, the contact part 24 may be formed using other techniques, considering that it is sufficient just to form the contact part 24. Specific techniques to form the contact part 24 come in a wide variety of types, and therefore a description thereof is omitted herein.

An optimal numerical value is selected as the outer diameter of the contact part 24 based on the outer diameter of the tube 1 and on the winding diameter and wire diameter of the suspension spring S so that, even if the lower end portion S1 of the broken suspension spring S moves in the radial direction of the tube 1, the contact part 24 comes into contact with the lower end portion S1 of the broken suspension spring S and interference of the lower end portion S2 of the broken suspension spring S with the tire T can be avoided. It should be noted that dimensions are set in such a manner that the inner circumference of the suspension spring S does not interfere with the outer circumference of the contact part 24 when the suspension spring S is in a normal state.

In view of forming a spring bearing of this type by press working, an outer circumferential surface of the contact part 24 is formed to have a shape of a circumferential surface that is concentric with the outer circumferential surface of the tube 1. However, in terms of prevention of a further movement of the lower end portion S1 of the broken suspension spring S by contact therewith, the outer circumferential surface of the contact part 24 may not be the circumferential surface that is concentric with the outer circumferential surface of the tube 1, although not illustrated.

Also, instead of being concentric with the outer circumferential surface of the tube 1, the outer circumferential surface of the contact part 24 may be formed as a surface with circumferentially continuous waves, or as a polygonal surface composed of a plurality of continuous flat surfaces. In this case, the contact part 24, that is to say, the exterior of the tube 1 can be formed in a hobby-oriented manner.

Also, while the contact part 24 is formed across the entire circumference of the lower spring bearing 2 in the present embodiment, in terms of prevention of a movement of the lower end portion S1 of the broken suspension spring S toward the tire T, the contact part 24 may be formed only in an outer circumferential portion opposite to an outer circumference opposing the tire T. In this case, the lower spring bearing 2 has a directional property because of the contact part 24.

Also, in the above-described embodiment, the outer annular part 23a and the inner annular part 23b of the joining part 23 are formed into an almost flat annular shape. However, considering that the outer annular part 23a and the inner annular part 23b function as the joining part 23, they may be formed into an arbitrary shape other than the one stated above.

As indicated by a line with alternate long and two short dashes in FIG. 1, a lower end side portion (no reference sign) of a dust cover 5 is positioned at an inner side of the suspension spring S. In view of this, the contact part 24 functions so as to close an opening between the tube 1 and the dust cover 5. Therefore, by providing the contact part 24, it is possible to suppress external dust from entering the inside of the dust cover 5.

In the above-described embodiment, the suspension spring S is wound such that it does not have an inclined orientation with respect to the shock absorber 100. Alternatively, the suspension spring S may be wound such that it has an inclined orientation with respect to the shock absorber 100. In this case also, the contact part 24 can prevent the lower end portion S1 of the broken suspension spring S from moving toward the tire T.

Also, in the embodiment, the lower end of the suspension spring S comes into direct contact with the lower spring bearing 2. Alternatively, a rubber sheet may be provided between the lower end of the suspension spring S and the lower spring bearing 2. In this case, rusting of the lower end of the suspension spring S, which could possibly occur due to direct contact between the lower end of the suspension spring S and the lower spring bearing 2, can be suppressed as much as possible, and impact therebetween can be absorbed. As a result, the occurrence of impact noise can be reduced.

Furthermore, in the above-described embodiment, the lower spring bearing 2 is formed by press working, and the contact part 24 is integrally formed. Alternatively, the contact part 24 may be provided by using a separate member, as long as it is guaranteed that the contact part 24 does not deteriorate or come off due to rust even after prolonged use of the vehicle over serviceable years.

Embodiments of this invention were described above, but the above embodiments are merely examples of applications of this invention, and the technical scope of this invention is not limited to the specific constitutions of the above embodiments.

This application claims priority based on Japanese Patent Application No.2012-172731 filed with the Japan Patent Office on Aug. 3, 2012, the entire contents of which are incorporated into this specification.

The invention claimed is:

1. A shock absorber provided with a suspension spring, the shock absorber comprising:
    a tube having a lower end portion configured to be joined to a vehicle axle side portion provided with a tire; and
    a lower spring bearing that is provided on an outer circumference of the tube and configured to support a lower end of the suspension spring, wherein the lower spring bearing includes:
    a bearing part on which the lower end of the suspension spring is seated;
    a contact part integrated with the bearing part such that the suspension spring seated on the bearing part extends over the contact part; and
    a first annular part located between the contact part and the bearing part, a portion of the first annular part extending substantially perpendicular to a surface of the tube,
    a proximal part welded to the outer circumference of the tube, and
    a second annular part connecting the contact part and the proximal part so as to support the contact part at a position radially distant from the outer circumference of the tube.

2. The shock absorber according to claim 1, wherein the proximal part is arranged so as to extend toward the lower end portion of the tube.

3. The shock absorber according to claim 1, wherein the proximal part is arranged so as to extend toward an upper end portion of the tube.

4. The shock absorber according to claim 1, wherein the contact part is formed as a cylindrical tube member that is concentric with the tube.

5. The shock absorber according to claim 1, wherein a height-wise dimension of the contact part is larger than a wire diameter dimension of the suspension spring.

6. The shock absorber according to claim 1, wherein the lower spring bearing is configured such that in case where the suspension spring moves toward the tire after being shortened due to breakage of a lower end portion thereof, the shortened suspension spring comes into contact with the contact portion.

7. A shock absorber provided with a suspension spring, the shock absorber comprising:
   a tube having a lower end portion configured to be joined to a vehicle axle side portion provided with a tire; and
   a lower spring bearing that is provided on an outer circumference of the tube and configured to support a lower end of the suspension spring, wherein
   the lower spring bearing includes:
      a bearing part on which the lower end of the suspension spring is seated;
      a contact part integrated with the bearing part such that the suspension spring seated on the bearing part extends over the contact part, and
      a first annular part located between the contact part and the bearing part, a portion of the first annular part extending substantially perpendicular to a surface of the tube,
   wherein an outer diameter of the contact part is larger than an outer diameter of the tube, and
   the lower spring bearing further includes a proximal part that is connected to the contact part and welded to the outer circumference of the tube, and the proximal part is arranged so as to extend toward the lower end portion of the tube.

8. The shock absorber according to claim 7, wherein the lower spring bearing further includes a second annular part located between the contact part and the proximal part.

9. The shock absorber according to claim 7, wherein the contact part is formed as a cylindrical tube member that is concentric with the tube.

10. The shock absorber according to claim 7, wherein a height-wise dimension of the contact part is larger than a wire diameter dimension of the suspension spring.

11. The shock absorber according to claim 7, wherein the lower spring bearing is configured such that in a case where the suspension spring moves toward the tire after being shortened due to breakage of a lower end portion thereof, the shortened suspension spring comes into contact with the contact portion.

* * * * *